US007500527B2

(12) United States Patent
Fischer et al.

(10) Patent No.: US 7,500,527 B2
(45) Date of Patent: Mar. 10, 2009

(54) HAND-HELD POWER TOOL WITH A DECOUPLING DEVICE

(75) Inventors: Axel Fischer, Wiedergeltingen (DE); Roland Meuer, Langerringen (DE); Ruediger Schulz, Klingenberg (DE); Ferdinand Kristen, Gilching (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/881,637

(22) Filed: Jul. 26, 2007

(65) Prior Publication Data

US 2008/0022817 A1 Jan. 31, 2008

(30) Foreign Application Priority Data

Jul. 27, 2006 (DE) ....................... 10 2006 000 374

(51) Int. Cl.
*B25F 5/02* (2006.01)
*B23B 45/16* (2006.01)

(52) U.S. Cl. ..................... 173/162.2; 173/170; 173/210

(58) Field of Classification Search .............. 173/162.1, 173/162.2, 210, 211, 201
See application file for complete search history.

(56) References Cited

U.S. PATENT DOCUMENTS 4,673,043 A * 6/1987 Greppmair ............... 173/162.2
5,025,870 A * 6/1991 Gantner .................. 173/162.2
5,303,907 A 4/1994 Holzheimer
6,076,616 A * 6/2000 Kramp et al. ............ 173/162.2
6,148,930 A * 11/2000 Berger et al. ............. 173/162.2
7,076,838 B2 * 7/2006 Meixner ...................... 16/431
7,287,601 B2 * 10/2007 Hellbach et al. ......... 173/162.2
7,320,369 B2 * 1/2008 Stirm et al. .............. 173/162.2
2004/0213867 A1 10/2004 Kalantzis

FOREIGN PATENT DOCUMENTS

| | | |
|---|---|---|
| CH | 0195398 | 4/1938 |
| DE | 3610682 | 10/1987 |
| FR | 0322664 | 2/1903 |

OTHER PUBLICATIONS

European Search Report.

* cited by examiner

*Primary Examiner*—Scott A. Smith
(74) *Attorney, Agent, or Firm*—Abelman, Frayne & Schwab

(57) ABSTRACT

A hand-held power tool includes a spring-mounted decoupling device (16) for supporting a tool handle (14) on a tool housing (4) and having a first support arrangement (18) including a connecting device (22) pivotally supported relative to the housing by a housing-side pivotal support (28) and relative to the handle (14) by a handle-side pivotal support (32), and a second support arrangement (20) that is spaced from the operational axis (A) in a second direction (y) perpendicular to the first direction (z) further away than the first support arrangement (18).

8 Claims, 6 Drawing Sheets

HAND-HELD POWER TOOL WITH A DECOUPLING DEVICE

BACKGROUND OF THE INVENTION

1. Field of the Invention

The present invention relates to a hand-held power tool, in particular in form of an electrical combination hammer that can be alternatively used as a hammer drill or a chisel hammer and that includes a housing in which there is provided operational means that reciprocates along an operational axis spaced from the gravity center of the tool and extending parallel to a first direction which corresponds to the operational direction of the tool. E.g., the operational means can be formed as a percussion or impact piston of an electro-pneumatic mechanism. The power tool further includes a handle supported on the housing by a spring-mounted decoupling device for preventing transmission of the housing vibrations to the handle. The decoupling device includes a first support arrangement and a second support arrangement that is spaced from the operational axis in a second direction, which is perpendicular to the first, operational direction, by a distance greater than the distance the first support arrangement is spaced from the operational axis.

2. Description of the Prior Art

In hand-held power tools of the type described above, during an operation, the housing is subjected to rotational oscillations which result from the operational axis being spaced from the tool gravity center. The use of the spring-mounted decoupling device with two support arrangements, which are spaced from each other in a direction transverse to the operational axis, permits to prevent the transmission of the vibrations acting on the housing to the handle. The device permits to reduce vibrations acting on the handle not only in the first direction but also in the second direction, increasing the comfort of a user holding the power tool.

The reduction of the vibrations is effected in all directions by a respective, most possible vibration-decoupled suspension of the handle, which quasi-isolates vibrations produced during an operation. Further, dependent on used spring means, more or less large damping effect is achieved. Below, reduction of the vibrations, which does not depend on the portion of the damping effect, for simplicity sake, will be referred to as decoupling.

German Publication DE 33 12 195 A1 discloses a hand-held power tool in form of a rotary-percussion hammer drill with a handle spring-mounted on the tool housing. Between the handle and the housing, there are provided upper spring-mounted means in the region of the percussion or operational axis and lower spring-mounted means that is formed by a spring-supported pivotal support that is spaced from the operational axis. The lower spring-mounted means has a higher spring stiffness than the upper spring-mounted means.

The known decoupling device should insure a stable guidance by the lower spring-mounted means while simultaneously insuring a high damping effect in the percussion or operational direction by the upper spring-mounted means.

However, the drawback of the known hand-held tool consists in that despite the all-side spring action applied to both spring-mounted means, an adequate decoupling of the handle from rotational oscillations acting on the housing is not possible. Rather, because of the rotational oscillations, the spring behavior of both spring-mounted means are superimposed. Because of the relatively stiff lower spring-mounted means and superimposition of the spring action of the upper spring-mounted means in the second direction, during an operation, relatively high vibrations along the second direction still remains.

Accordingly, an object of the present invention is to provide a hand-held power tool in which the drawbacks of the known power tool are eliminated and rotational oscillations, which are transmittable to the handle, are reduced.

SUMMARY OF THE INVENTION

This and other objects of the present invention, which will become apparent hereinafter, are achieved by providing, in the hand-held power tool, a decoupling device the first support arrangement of which includes a connection device pivotally supported relative to the housing by a housing-side pivotal support and relatively to the handle, by a handle-side pivotal support. The connecting device permits, during an operation, almost unobstructed rotational oscillation of the tool housing about the tool gravity center, with decoupling of the rotational oscillations being insured almost exclusively by the second support arrangement. The handle is guided along the second direction by the first support arrangement more or less free relatively to the housing, so that a spring-mounted support of the handle on the housing at the main axis in the second direction is provided by the second support arrangement. This permits to optimally effect decoupling along the first direction independent from decoupling in the second direction in accordance with particular requirements. In this way, the vibrations of the housing, which are caused by the rotational oscillations, can be decoupled from the handle particularly good. Thereby, only substantially reduced vibrations are perceived by the user holding the handle.

According to a particularly advantageous embodiment, the connecting device is located at a height of a gravity center of the tool with regard to the first direction and extends substantially parallel to the operational axis. Thereby, the transmittable forces, which act on the first support arrangement along the second direction, are approaching zero, so that decoupling of the handle by a spring support on the housing is provided quasi completely by the second support arrangement. As a result, the determination of the decoupling along the first direction can be done in accordance with respective requirements independent of the decoupling along the second direction. Also, thereby, a particular good transmission of the force from the handle to the housing along the first direction is possible.

Advantageously, the connecting device has a con-rod-shaped member. A so formed member enables a very stable double pivotal connection of the handle with the housing. Simultaneously, the space, which is required for the connection device, is reduced.

Advantageously, the connecting device has U-shape and includes a second con-rod-shaped member extending parallel to the first con-rod-shaped member and connected therewith by a connection element extending along a third direction. The third direction is perpendicular to both the first and second directions. In this way, the handle is particularly stably supported on the housing in the third direction.

Advantageously, there is provided a first spring arrangement acting on the first support arrangement and supporting the handle against the housing in the first direction.

Thereby, the vibrations, which act in the first direction and are transmitted from the housing to the handle by the first support arrangement, are substantially prevented.

Advantageously, the first spring arrangement has a circumferential resilient member supported on a housing-side pivotal support between housing-side support means and connecting device-side support means. With such, e.g., annular, circumferential resilient member which, e.g., is supported on a housing-side journal and is supported radially outwardly on an eyelet of the con-rod shaped member, the connecting device is operatively decoupled from the housing both along the first direction and along the second direction.

It is advantageous when the circumferential resilient member is formed of a foamed elastomer. This insures particularly good spring characteristics of the resilient member, together with a cost-effective manufacturing of the resilient member. In addition, the dimensions of a such resilient member in different directions can be in a simple manner so formed that different spring constant in respective directions are obtained. Thus, e.g., a good decoupling of the handle from the housing is achieved in the operational direction of the power tool upon application of pressure to the handle, when a direct force transmission is insured in the opposite direction upon application of a tensioning force to the handle.

Alternatively, or in addition, the first con-rod-shaped member includes a first member and a second member telescopically displaceable relative to each other. The first spring arrangement has a spring element for supporting one of the first and second members in the first direction on the other member or on a housing-side pivotal support. Thereby, both members of the con-rod-shaped member are supported relative to each other by a spring that acts along the first direction. Thereby, the decoupling in the first direction and in the second direction can be established independent from each other.

It is advantageous to form the spring element of a foamed elastomer which has a progressive characteristic curve, so that the decoupling device would insure, over its service life, substantially the same spring characteristic curve. Alternatively, the spring element can be formed by a spiral spring.

It is further advantageous when the second support arrangement has a bar-shaped support element surrounded by a further support element, and a second spring arrangement is arranged between the bar-shaped support element and the further support element. Such a second spring arrangement permits a particularly good setting of a predetermined spring stiffness that acts uniformly in the radial direction around the bar-shaped support element. In addition, in this way, a relatively weak spring action is produced in the rotational direction around the bar-shaped support element. Altogether, thereby, a particular good decoupling of the handle from housing vibrations, which are caused by the rotational oscillation, is achieved.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiments, when read with reference to the accompanying drawings.

DETAILED DESCRIPTION OF THE PREFERRED EMBODIMENT

Figure 1:
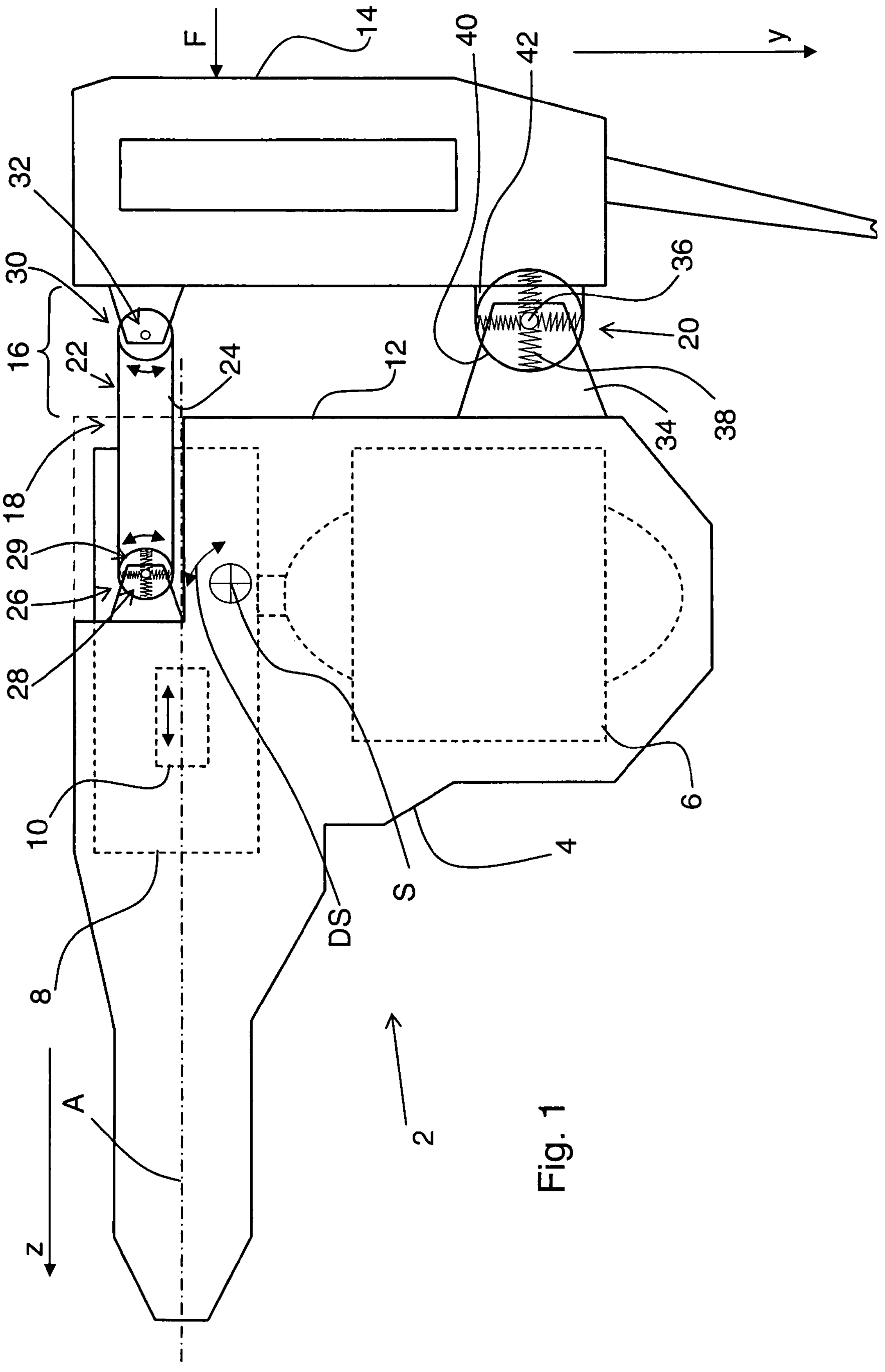
FIG. 1 a principal schematic view of a hand-held power tool according to the present invention.

FIG. 1 shows a principal schematic view of a hand-held power tool 2 according to the present invention and which is formed as an electrical combination hammer that can be alternatively used as a hammer drill or chisel hammer. The power tool 2 has a housing 4 in which a drive motor 6 and an electro-pneumatic drive unit 8, e.g., a percussion mechanism which is driven by the electric motor 6, are located. The drive unit 8 includes a gear unit and operating means, e.g., in form of a percussion or impact piston 10 that reciprocates during an operation along an operational axis A which determines a parallel first direction z that corresponds to the operational direction of the hand-held power tool 2. The operational axis A is spaced from the gravity center S of the hand-held power tool 2 which, e.g., can be defined by the gravity center of the mass of the hand-held power tool 2 at a middle position of the operational means 10. The distance between the gravity point S and the operational axis A results in generation, during operation of the hand-held power tool 2, of rotational oscillations which are indicated with arrow DS.

At the rear side 12 of the housing 4, a handle 14 is held which extends essentially along a second direction y perpendicular to the first direction z. The handle 14 is connected with the housing 4 by a spring-mounted decoupling device generally designated with a reference numeral 16. The decoupling device 16 has a first support arrangement 18 that is located adjacent to the operational axis A, and a second support arrangement 20 in form of a spring-mounted pivot support which, with reference to the second direction y, is spaced further from the operational axis A than the first support arrangement 18.

The first support arrangement 18 has a connecting device 22 with a first con-rod-shaped member 24. The member 24 is held, at a house-side end 26, on the housing 4 by a housing-side pivot support 28. The connecting device 22 further has a first spring arrangement 29 that can have different spring constants at different sides or in different directions. E.g., it can make sense to provide a relatively weak spring action along the first direction z, in the operational direction, in order to achieve a good decoupling of the vibration during an operation of the hand-held power tool 2, whereas it can be advantageous to have a high spring stiffness in the opposite direction in order to insure, e.g., as direct as possible transmission of a force from the handle to the housing when the hand-held power tool 2 has jammed. At the handle-side end 30, the connecting device 22 is pivotally supported on the handle 14 by a handle-side pivot support 32.

The second support arrangement 20 has a support 34 which is fixedly secured on the housing 4 and includes a bar-shaped support member 36 extending parallel to a third direction x extending perpendicular to both the first direction z and the second direction y. The bar-shaped support member 36 is supported radially circumferentially by a second spring arrangement 38 on a tubular support element 40 of a hand-side support device 42.

Figure 2:
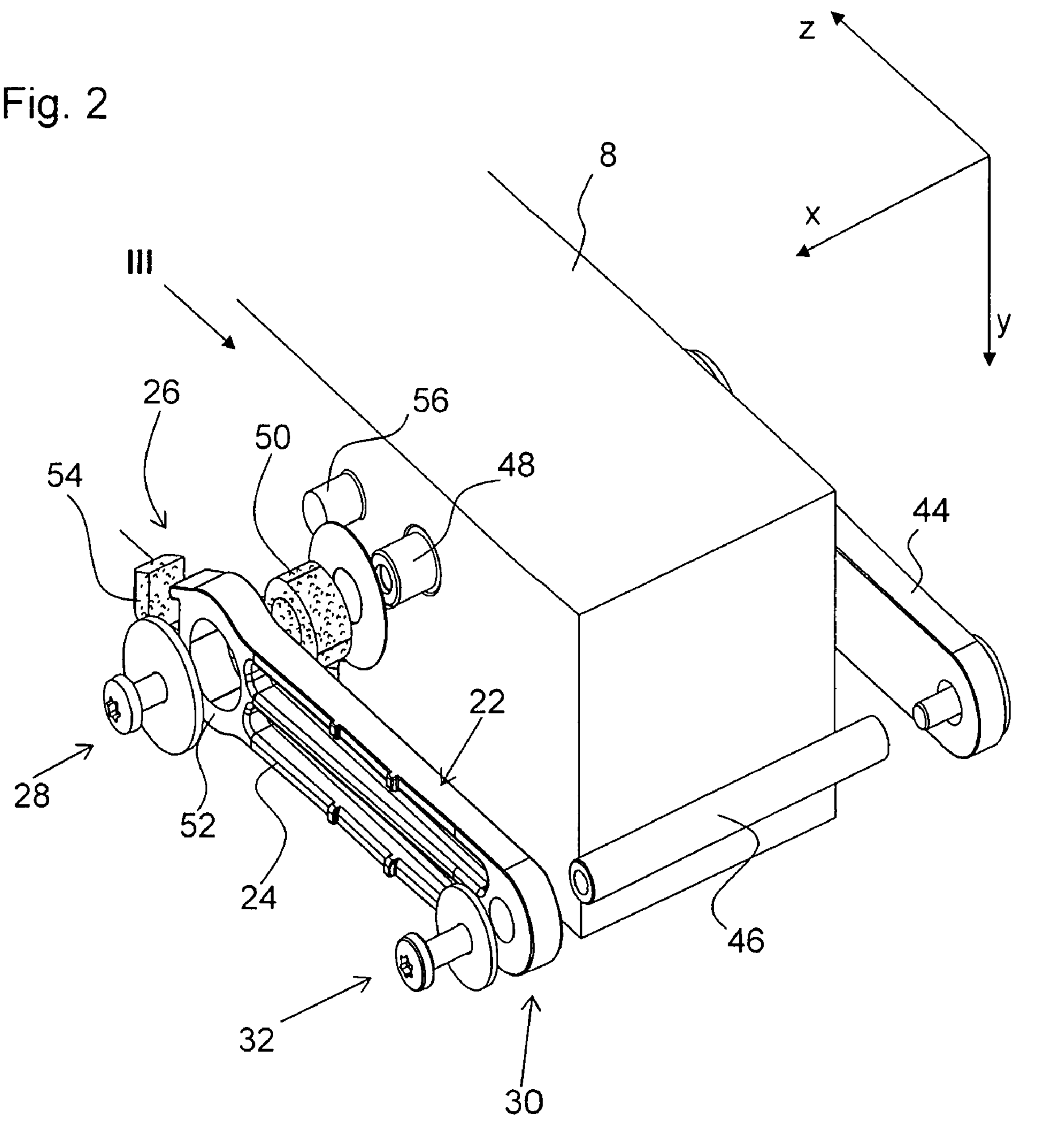
FIG. 2 a perspective exploded view of a first support arrangement of the hand-held power tool according to FIG. 1.

As particularly shown in FIG. 2, the connecting device 22 has, in addition to a first con-rod-shaped member 24, a second con-rod-shaped member 44. Both con-rod-shaped members 24, 44 extend parallel to each and essentially along the first direction z. On the handle-side end 30, there is also provided a connection element 46 that extends along the third direction x. Thereby, the connecting device 22 assumes a U-shape that can be widened with a further, not shown connection element to form a closed rectangular shape at the housing-side end 26.

Figure 3:
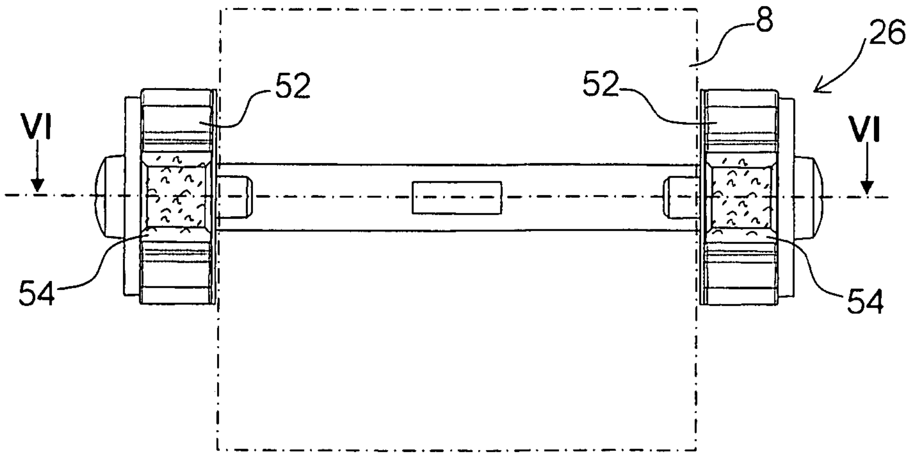
FIG. 3 a view of the first support arrangement in an assembled condition in direction of arrow III in FIG. 2.
Figure 4:
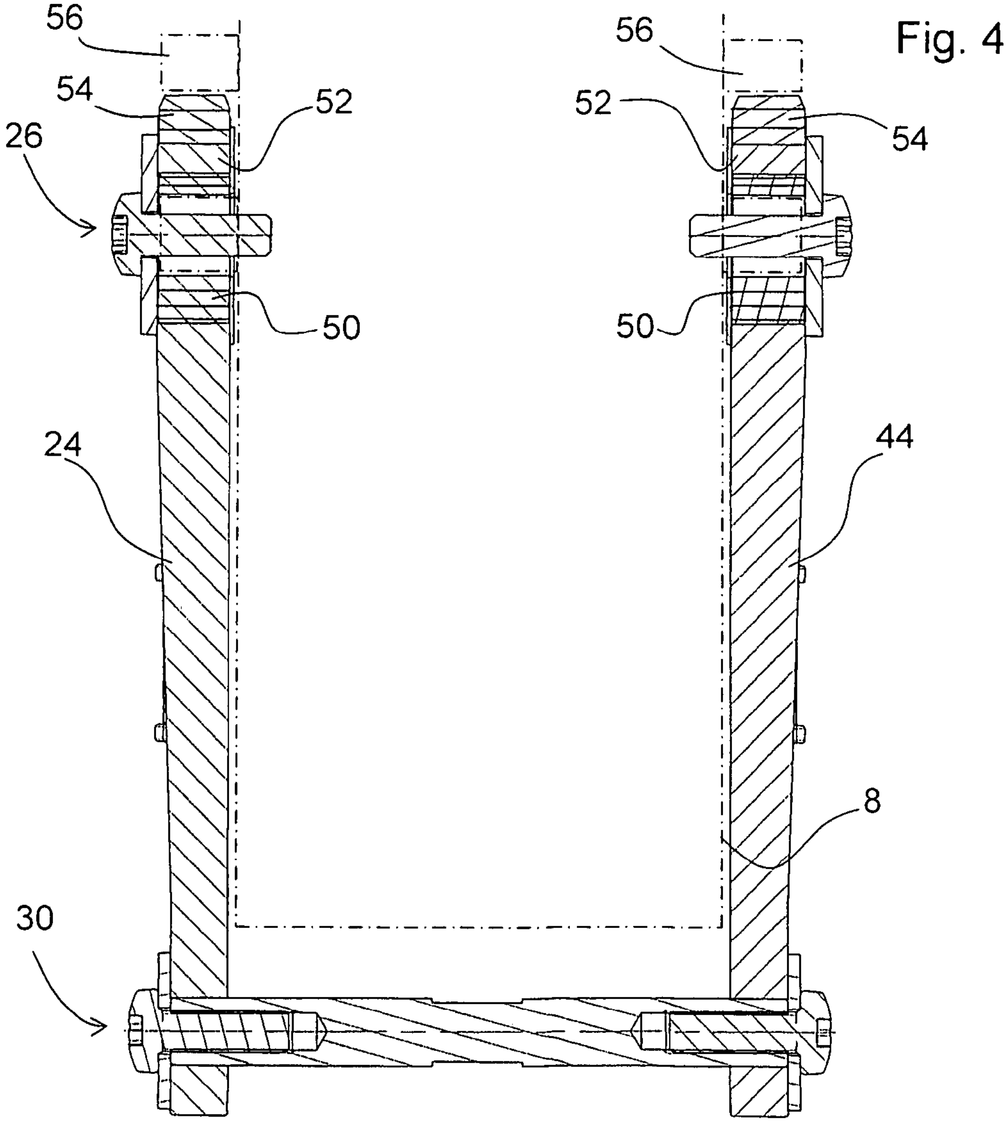
FIG. 4 a cross-sectional view of the support arrangement along line IV-IV in FIG. 3.

As further shown in FIG. 2, the housing side pivotal support 28 has support means 48 in form of a journal fixedly secured on the housing side of the drive unit 8. The support means 48 cooperates with support means 52 in form of an eyelet provided on the connecting device 22, with intermediate means in form of a circumferential resilient member 50 of the spring arrangement 29 being arranged between the support means 48 and the support means 52, as shown in particular in FIGS. 3-4. Corresponding support means 48, 52 is provided on the housing-side end 26 of the con-rod-shaped member 44.

The first spring arrangement 29 has a support spring 54 provided on each of the two con-rod-shaped members 24, 44. The support spring 54 supports the respective member 24, 44 in the first direction z on the support element 56 of the drive unit 8 and via the drive unit 8 against the housing 4. The support springs 54 and the circumferential resilient member 50 are formed, as shown, of a foamed elastomer and form together a spring unit that provides for a resilient support of the handle 14 on the housing 4 in the first direction z via the first support arrangement 18. The support springs 54 have a different spring stiffness than the circumferential resilient member 50 and serve as end stops in order to protect the circumferential resilient member 50 from overload.

Figure 5:
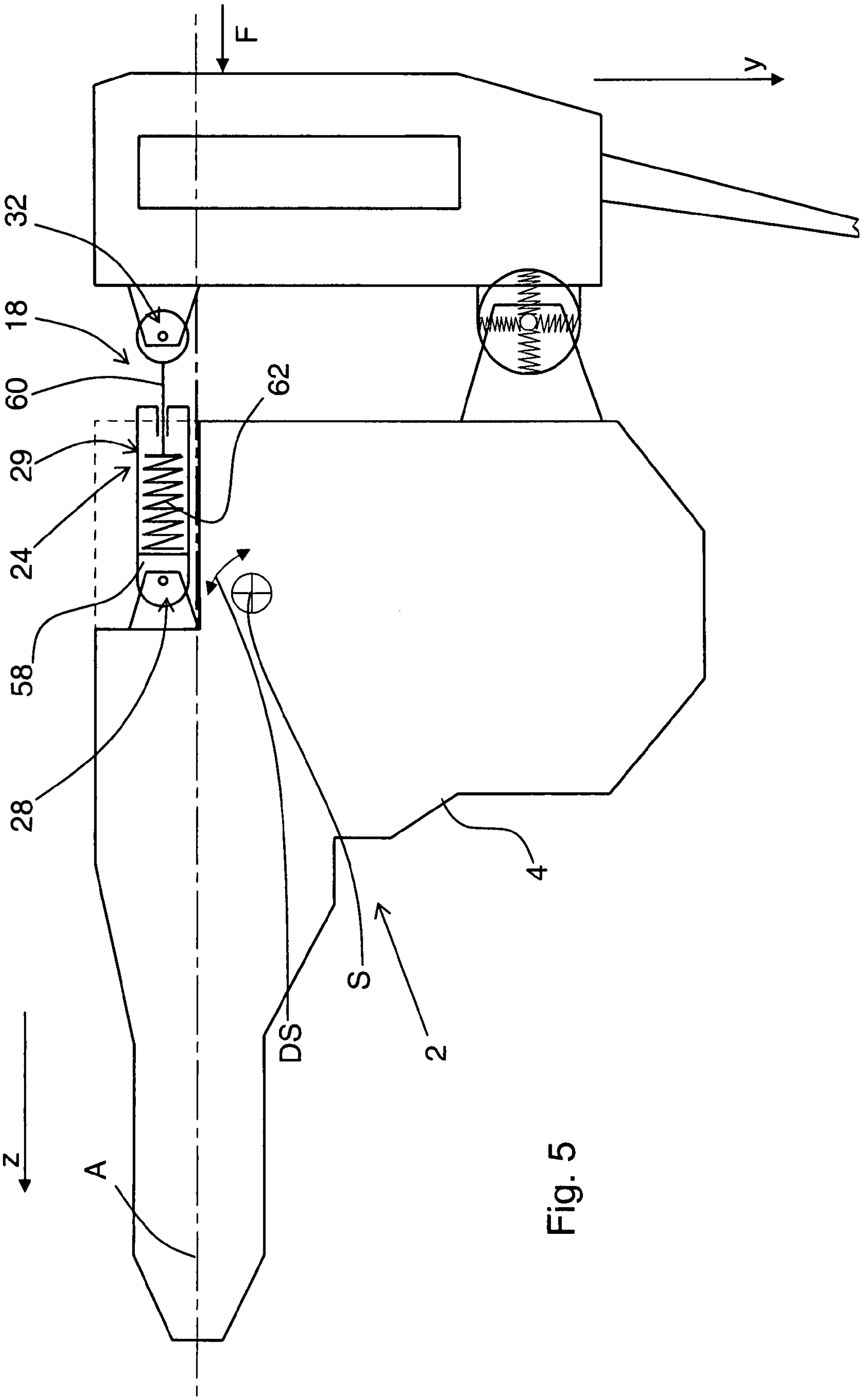
FIG. 5 a principal schematic view of an alternative embodiment of a hand-held power tool according to the present invention.
Figure 6:
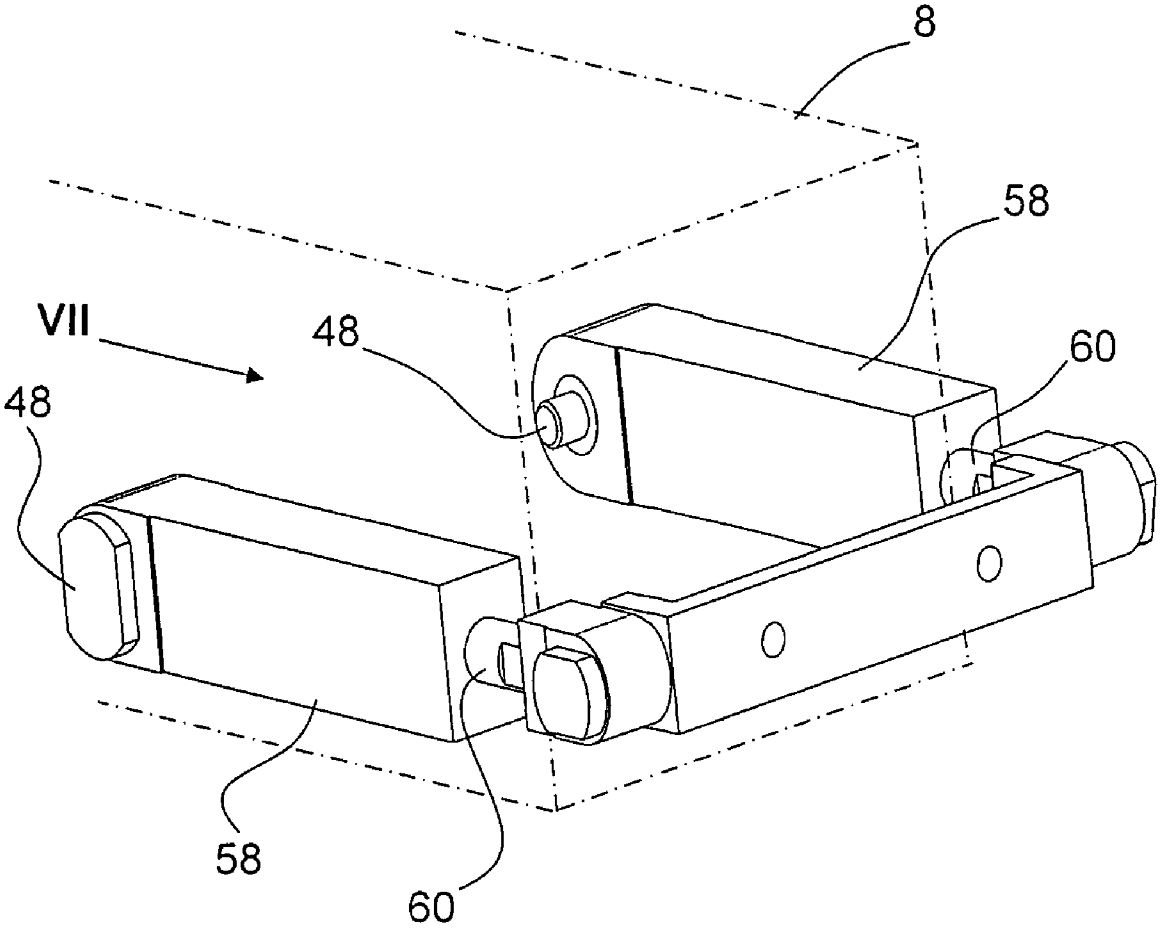
FIG. 6 a perspective exploded view of a first support arrangement of the hand-held power tool according to FIG. 5.
Figure 7:
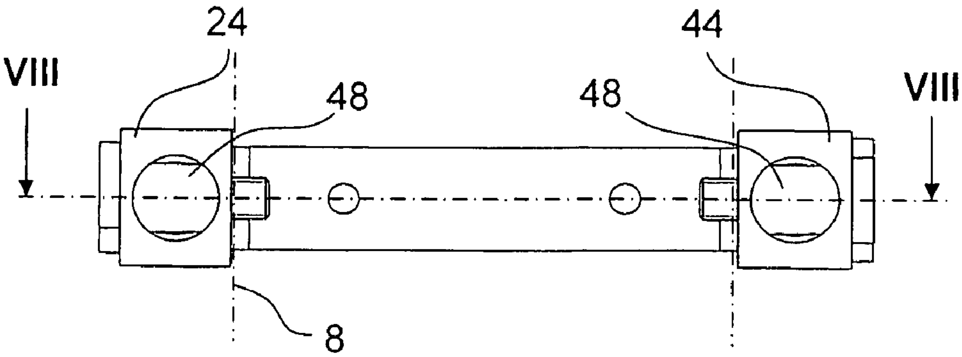
FIG. 7 a view of the first support arrangement in an assembled condition in direction of arrow VII in FIG. 6.
Figure 8:
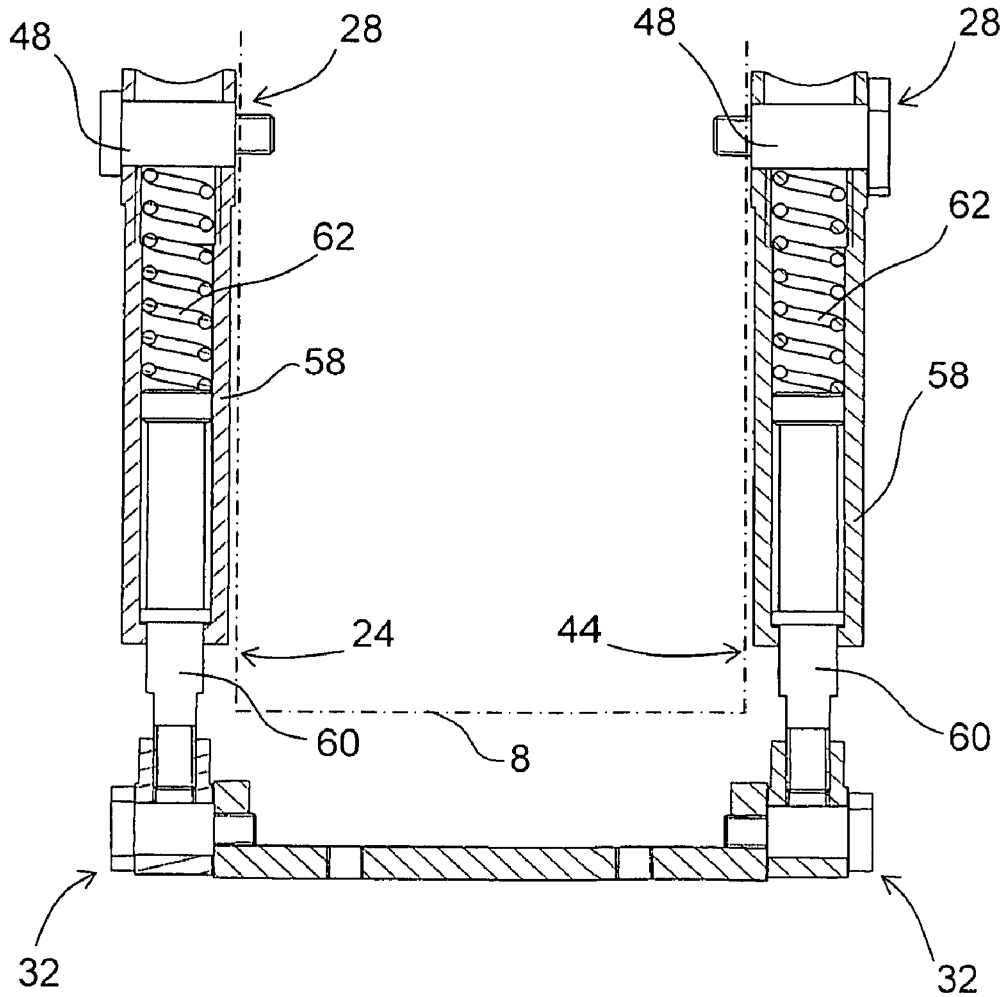
FIG. 8 a cross-sectional view of the support arrangement along line VIII-VIII in FIG. 7.

FIG. 5 shows a hand-held power tool 2 with an alternatively formed first support arrangement 18. Here, the elements with the functions corresponding to the functions of elements of the embodiment according to FIGS. 1-4, have the same reference numerals.

As shown in FIGS. 5-8, the first con-rod-shaped member 24 and the second con-rod-shaped member 44 of the alternative embodiment have, respectively, a housing-side first member 58 and a handle-side second member 60. The first member 58 and the second member 60 pivots, respectively, about a housing-side pivot support 28 and the handle-side pivot support 32. Both members 58, 60 are displaced telescopically relative to each other. The spring arrangement is formed by a respective spring element 62 that is shown functionally in FIG. 5 as a spiral spring, which is located within the sleeve-shaped first member 58. The spring element 62 is preferably formed of a foamed elastomer and with a progressive spring characteristic (see FIG. 8). The second member 60 functions as a piston that is held in the first member 58 and is displaceable against the biasing force of the spring element 62 along the first direction z toward the housing 4. The spring element 62 is supported, as particularly shown in FIG. 8, at the end remote from the second member 60, against a screw-shaped fastening element that functions as housing-side support means 48 and projects through connecting device-side support means 52 formed as a corresponding receiving bore.

Thus, the first support arrangement 18 of both embodiments has a double pivotability which provides for quasi-complete decoupling of the handle 14 along the second direction y via the first support arrangement 18. The resilient support in the second direction is effected exclusively by the second spring arrangement 38 on the second support arrangement 20 and which also can be formed of a foamed elastomer.

With the second support arrangement 20 being formed, in particular, as a pivotal support, the resilient support of the handle 14 on the housing 4 along the first direction z is provided, during the operation of the hand-held power tool 2, by the first support arrangement 18 located adjacent to the operational axis A. This is particularly the case when a press-on force applied by a user to the handle 14, is applied likewise along or in vicinity of the operational axis A.

Thus, it is possible to separately effect decoupling in the direction of the first direction z and in the direction of the second direction y. Thereby, the handle 14 can be decoupled particularly good from housing vibrations caused by rotational oscillations about the gravity center S of the hand-held power tool 2.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A hand-held power tool, comprising: a housing (4); operational means (10) provided in the housing (4) and reciprocating, during an operation, along an operational axis (A) spaced from a gravity center (S) of the tool and extending parallel to a first direction (z); a handle (14); a spring-mounted decoupling device (16) for supporting the handle (14) on the housing (4) and having a first support arrangement (18) including a connecting device (22) pivotally supported relative to the housing by a housing-side pivotal support (28) and relative to the handle (14) by a handle-side pivotal support (32); and a second support arrangement (20) that is spaced from the operational axis (A) in a second direction (y) perpendicular to the first direction (z) further away than the first support arrangement (18) is spaced from the operational axis (A) in the second direction (y), wherein the connecting device (22) has a first con-rod-shaped member (24), and wherein the connecting device (22) has U-shape and includes a second con-rod-shaped member (44) extending parallel to the first con-rod-shaped member (24) and connected therewith by a connection element (46) extending along a third direction (x) that is perpendicular to the first (z) and second (y) directions.

2. A hand-held power tool according to claim 1, wherein the connecting device (22) is located at a height of a gravity center of the tool with regard to the first direction (z) and extends substantially parallel to the operational axis (A).

3. A hand-held power tool according to claim 1, further comprising a first spring arrangement (29) acting on the first support arrangement (18) and supporting the handle (14) against the housing in the first direction (z).

4. A hand-held power tool according to claim 3, wherein the first spring-arrangement (29) has a circumferential resilient member (50) supported on the housing-side pivotal support (28) between a housing-side support means (48) and a connecting device-side support means (52).

5. A hand-held power tool according to claim 4, wherein the circumferential resilient member (50) is formed of a foamed elastomer.

6. A hand-held power tool according to claim 3, wherein the first con-rod-shaped member (24) includes a first member (58) and a second member (60) telescopically displaceable relative to each other, and wherein the first spring arrangement (29) has a spring element (62) for supporting one of the first (58) and second (60) members in the first direction (z).

7. A hand-held power tool according to claim 6, wherein the spring element (62) is formed of an elastomer.

8. A hand-held power tool according to claim 7, wherein the second support arrangement (20) has a bar-shaped support element (36) surrounded by a further support element (42), and a second spring arrangement (38) arranged between the bar-shaped support element (36) and the further support element (42).

* * * * *